United States Patent
Roy et al.

(10) Patent No.: US 11,630,224 B2
(45) Date of Patent: Apr. 18, 2023

(54) SUBSURFACE FLUID-TYPE LIKELIHOOD USING EXPLAINABLE MACHINE LEARNING

(71) Applicant: Landmark Graphics Corporation, Houston, TX (US)

(72) Inventors: Samiran Roy, Bangalore (IN); Shashwat Verma, Bengaluru (IN)

(73) Assignee: Landmark Graphics Corporation, Houston, TX (US)

( * ) Notice: Subject to any disclaimer, the term of this patent is extended or adjusted under 35 U.S.C. 154(b) by 251 days.

(21) Appl. No.: 17/119,181

(22) Filed: Dec. 11, 2020

(65) Prior Publication Data

US 2022/0187484 A1    Jun. 16, 2022

(51) Int. Cl.
 *G01V 1/28* (2006.01)
 *G01V 1/30* (2006.01)

(52) U.S. Cl.
 CPC .............. *G01V 1/282* (2013.01); *G01V 1/301* (2013.01); *G01V 1/307* (2013.01);
 (Continued)

(58) Field of Classification Search
 CPC ........ G01V 1/282; G01V 1/301; G01V 1/307; G01V 2210/512; G01V 2210/632; G01V 2210/645
 See application file for complete search history.

(56) References Cited

U.S. PATENT DOCUMENTS 11,262,468 B2 *  3/2022  Roy ...................... G01V 1/30
2019/0146108 A1    5/2019  Magill
(Continued)

FOREIGN PATENT DOCUMENTS

CN    108830421 A  * 11/2018  .......... G06N 3/0454
CN    113393335 A  *  9/2021
(Continued)

OTHER PUBLICATIONS

Hami-Eddine et al., "A Growing Machine Learning Approach to Optimize Use of Prestack and Poststack Seismic Data", Society of Exploration Geophysicists International International Exposition and Annual Meeting, 2017, pp. 2149-2152.
(Continued)

*Primary Examiner* — Daniel Pihulic
(74) *Attorney, Agent, or Firm* — Kilpatrick Townsend & Stockton LLP

(57) ABSTRACT

A system is described for determining a likelihood of a type of fluid in a subterranean reservoir. The system may include a processor and a non-transitory computer-readable medium that includes instructions executable by the processor to cause the processor to perform various operations. The processor may receive pre-stack seismic data having seismically-acquired data elements for geometric locations in a subterranean reservoir. The processor may determine, using the pre-stack seismic data, input features for each geometric location and may execute a trained model on the input features for determining a likelihood of a type of fluid in the subterranean reservoir and for determining a list of features affecting the likelihood. The processor may subsequently output the likelihood and the list of features.

20 Claims, 6 Drawing Sheets

(52) U.S. Cl.
CPC .. *G01V 2210/512* (2013.01); *G01V 2210/632* (2013.01); *G01V 2210/645* (2013.01)

(56) References Cited

U.S. PATENT DOCUMENTS

| | | | |
|---|---|---|---|
| 2020/0088897 A1 | 3/2020 | Roy et al. | |
| 2020/0097439 A1 | 3/2020 | Sinay et al. | |
| 2022/0025756 A1* | 1/2022 | Martinez | E21B 49/003 |
| 2022/0187484 A1* | 6/2022 | Roy | G01V 1/301 |
| 2022/0206177 A1* | 6/2022 | Saikia | G01V 1/307 |

FOREIGN PATENT DOCUMENTS

| | | | | |
|---|---|---|---|---|
| EP | 3526629 B1 | 11/2020 | | |
| WO | 2018201114 A1 | 11/2018 | | |
| WO | WO-2022125122 A1 * | 6/2022 | | G01V 1/282 |
| WO | WO-2022146423 A1 * | 7/2022 | | G01V 1/307 |

OTHER PUBLICATIONS

Liu et al., "Patterns Classification in Assisting Seismic Facies Analysis", Society of Exploration Geophysicists International Exposition and Annual Meeting, 2017, pp. 2127-2131.

Shi et al., "Interactive Tracking of Seismic Geobodies Using Deep Learning Flood-Filling Network", Society of Exploration Geophysicists International Exposition and Annual Meeting, 2019, pp. 2248-2252.

Smith, "Geobody Interpretation Through Multiattribute Surveys, Natural Clusters and Machine Learning", Society of Exploration Geophysicists Technical Program Expanded Abstracts, 2017, pp. 2153-2157.

Zhang et al., "Machine Learning Based Technique for Lithology and Fluid Content Prediction—Case Study from Offshore West Africa", Society of Exploration Geophysicists International Exposition and Annual Meeting, 2018, pp. 2271-2276.

PCT Application No. PCT/US2020/065912, "International Search Report and Written Opinion", dated Aug. 30, 2021, 11 pages.

\* cited by examiner

SUBSURFACE FLUID-TYPE LIKELIHOOD USING EXPLAINABLE MACHINE LEARNING

TECHNICAL FIELD

The present disclosure relates generally to exploring subsurface environments for hydrocarbon fluid and, more particularly (although not necessarily exclusively), to determining likelihoods of fluid type in subsurface reservoirs.

BACKGROUND

A subterranean formation may include at least one subterranean reservoir with hydrocarbon fluids. The hydrocarbon material may include oil, gas, mixtures of one or more hydrocarbon fluids and water, etc. The hydrocarbon fluid may exist at different relative concentrations based on numerous factors such as seismic depth, physical features of the subterranean formation, lithography, and the like. The relative concentrations of the hydrocarbon material may influence whether it is economical to drill a well into the subterranean formation. The type of hydrocarbon fluid may additionally influence whether it is economical to drill a well into the subterranean formation, but surface measurements of the type of hydrocarbon fluid may be inaccurate in part since features influencing the type of hydrocarbon fluid may not be known.

Machine learning (ML), or artificial intelligence (AI), algorithms can improve outputs of various modeling applications such as for hydrocarbon exploration. The algorithms may function as a black box: an input comes into the algorithm and an output comes out of the algorithm. However, no explanation may accompany the output explaining to a user of the algorithms reasons or features of the input that influences the output.

DETAILED DESCRIPTION

Figure 1:
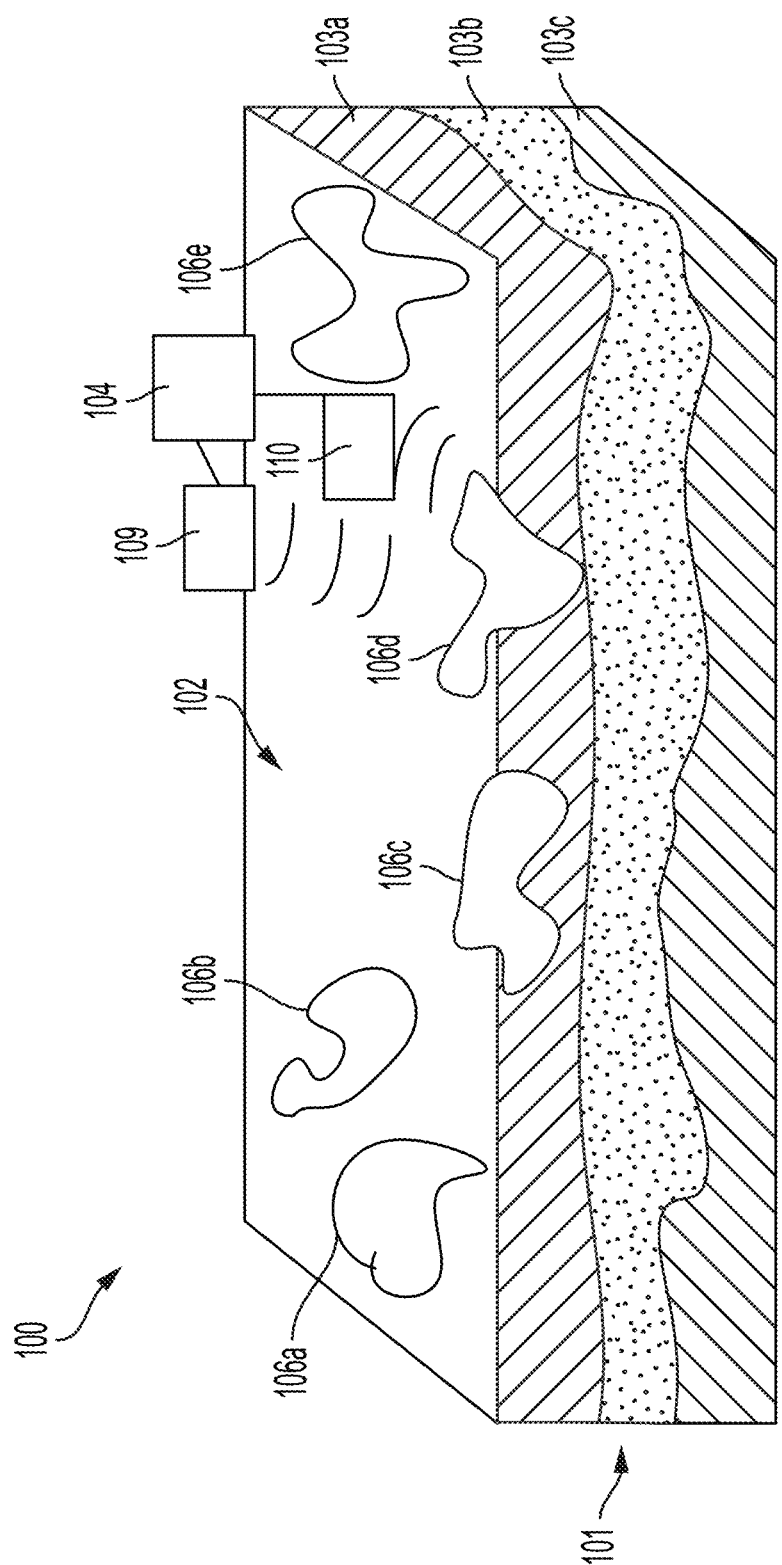
FIG. 1 is a cross-sectional side view of a subterranean formation having at least one subterranean reservoir that includes at least one type of fluid according to one example of the present disclosure.

Certain aspects and examples of the present disclosure relate to determining a likelihood of fluid-type in a subterranean reservoir and a list of features affecting the likelihood using an explainable machine learning algorithm. The subterranean reservoir may be included in a subterranean formation and may include various fluids such as oil, natural gas, and water, etc. The likelihood of fluid-type in the subterranean reservoir may be a percentage value representing how likely it is that each fluid-type exists in the subterranean reservoir. The list of features may include an amplitude of a reflection angle or of an offset, an amplitude frequency, structural features including lithology and rock total compressibility of the subterranean reservoir, and the like. The list of features may be generated by the explainable machine learning algorithm. For example, a computing device may apply the explainable machine learning algorithm to pre-stack seismic data from the subterranean reservoir by executing a trained, predictive model for determining the likelihood of fluid-type in the subterranean reservoir. The explainable machine learning algorithm may then output, in addition to the likelihood of fluid-type in the subterranean reservoir, the list of features affecting the likelihood. The features may be organized in order of descending influence in determining the likelihood of fluid-type in the subterranean reservoir. The features may be organized in other suitable means for conveying the list of features.

An explainable machine learning algorithm may be an algorithm that outputs an explanation of the output. For example, a machine learning algorithm may output the likelihood of fluid-type in the subterranean reservoir. But, the explainable machine learning algorithm may output the likelihood of fluid-type in the subterranean reservoir and an explanation of the output. In this example, the explanation can be a list of input features that affect the fluid-type determination. The explanation can be other suitable means for explaining a machine learning algorithm output. The pre-stack seismic data can include seismically gathered data from the subterranean formation. Some examples of pre-stack seismic data can include data elements such as geometric locations in the subterranean formation, angles of reflection with respect to the geometric locations, offset values with respect to the geometric locations, and other suitable seismically-acquired data about the subterranean formation.

Using an explainable machine learning algorithm may allow an operator of an exploration operation to more accurately model the subterranean formation. The explainable machine learning algorithm can convey input features that affect or otherwise change the likelihood of fluid-type determination. Knowing which features affect the fluid-type in the subterranean reservoir the most can allow the operator to more accurately model the subterranean formation, and with a more accurate model of the subterranean formation, the exploration operation may output a more accurate, or otherwise more valuable, recommendation for well-drilling operations with respect to the subterranean formation. Additionally, in some examples, the explainable machine learning algorithm may increase the efficiency of future exploration operations by being trained with data relating to features that affect the determination of fluid-type in the subterranean reservoir.

Direct Hydrocarbon Indicators (DHI) can play a role in identifying and modeling subterranean formations or subterranean reservoirs using patterns in seismic signatures. In some examples, the subterranean reservoirs may include hydrocarbon material. Amplitude versus angle (AVA) and amplitude versus offset (AVO) are models that may be used for this purpose. But, identifying AVO classes and correlation to fluid presence may use fluid replacement modeling and near-perfect flattened pre-stack seismic data. Both can be time consuming, among other challenges. Additionally, presence of coal and residual gas can create uncertainties in AVA or AVO responses. Human interpretation and related biases can also lead to difficulties in reservoir fluid-type determination from seismic data. These uncertainties associated with AVA or AVO analysis and fluid-type likelihood determination can be addressed through explainable machine learning (ML) techniques.

AVA or AVO data creation can be addressed using algorithms from seismic angle or offset data for a given geometric location with a search window for addressing a non-flatness character of practical seismic data. The likelihood determination of type of reservoir fluids can additionally be addressed using the AVA or AVO data output by the algorithms. In one example, each anomalous point and associated pre-stack seismic data value are used to determine the fluid, or the presence of coal, based on a ML model trained with known well-drilled results. In another example, the generated AVA or AVO plots can be analyzed for different reservoir fluid patterns using flexible and explainable ML techniques. In this example, artificial intelligence (AI) may determine fluid-type likelihood in the subterranean formation or reservoir and may additionally rank similar known cases.

AVO or AVA inversion modeling may not address presence of fizz gas or residual gas and may not incorporate past drilled results. Incorporating fizz gas (i.e., residual gas) and past drilled results, however, may increase the accuracy of a fluid-type likelihood determination. AVO or AVA classes can be pre-defined for conditioned seismic data, and, accordingly, the AVO or AVA classes may suggest a probable fluid-type presence. A data-driven approach to quantitative interpretation of seismic data can be used, and the approach can explain the features for concluding the fluid likelihood prediction value. Additionally, the approach can allow for rapidly estimating massive seismic gathers with associated fluids.

Fluid likelihood may be determined through explainable artificial intelligence (AI), or ML techniques, using seismic angle or offset data for probable reservoir geo-anomalies. In some examples, the techniques may involve extracting plots using the pre-stack seismic data via a simple and efficient search algorithm. The examples may additionally include plotting the data with a unique identifier for each reservoir cluster. Once processed, labelled geo-bodies may be trained as a fluid-type likelihood estimator. Explainable AI approaches such as automatic feature selection, SHAP-based and LIME-based model explanation, and random forest algorithms, can be used to build a system capable of providing a measure of model certainty. Feature selection can additionally be semi-automated and can reduce manual work in the model creation step, thereby saving time. An additional portion of the system may use generated AVA signatures for automatic spatial and history matching processes for finding similar geo-bodies that have been previously interpreted. This may allow data driven decisions to be made that use model outputs. In some examples, the models can be more user-friendly via an application set that covers data ingestion, cleaning, model training, retraining, and results visualization and analysis.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a cross-sectional side view of a subterranean formation 100 having at least one subterranean reservoir 106 that includes at least one type of fluid according to one example of the present disclosure. The subterranean formation 100 may include an underground region 101 and a surface region 102. The underground region 101 may be formed of various strata 103a-c that include different materials (e.g., rock, soil, oil, water, or gas) and vary in thickness and shape. Subterranean reservoirs 106a-e may be included in the strata 103 and may include hydrocarbon material.

At least one sensor 110, and at least one transmitter 109 may be communicatively coupled to a computing device 104. The transmitter 109 may transmit signals into the subterranean formation 100 for determining data about the reservoirs 106. The sensor 110 may receive, or otherwise detect, signals that bounce or otherwise reflect off of the reservoirs 106. The sensor 110 may transmit the received signals as pre-stack seismic data to the computing device 104 for determining a likelihood of fluid-type in the reservoirs 106. The computing device 104 can be positioned at the surface 102 of the subterranean formation 100 or elsewhere (e.g., offsite). The computing device 104 may be in communication with the drill strings, sensors 110, or other electronic devices used for exploration. For example, the computing device 104 can include a communication interface, or be communicatively coupled to a communications device, for transmitting information to and receiving information from another communication interface of an exploration subsystem. In some examples, the computing device 104 can receive information from the subterranean formation 100 (or elsewhere) in substantially real time, which can be referred to as real-time data. The geological data, or pre-stack seismic data, may include data elements relating to one or more of the reservoirs 106 and may be subsequently used for determining the likelihood of fluid-type in the reservoirs 106. The determined likelihood of fluid-type in the reservoirs 106 can be analyzed by a user (e.g., a geologist or an operator of an exploration operation) for determining whether to recommend drilling a well into the subterranean formation 100.

The computing device 104 may be communicatively coupled to the transmitter 109 and to the sensor 110. Although one computing device 104 is depicted in FIG. 1, in other examples, more than one computing device can be used, and, together, the multiple computing devices can perform operations such as those described in the present disclosure. The computing device 104 is depicted as being positioned at the surface 102, but, in other examples, the computing device 104 can be positioned belowground, aboveground, onsite, in a vehicle, offsite, etc.

In some examples, the computing device 104 can include a communication device. The communication device can represent one or more of any components that facilitate a network connection. For example, the communications device can allow the computing device 104 to interface with other devices via a wired connection. But, in other examples, the communication device can allow the computing device 104 to interface with other devices wirelessly and can include wireless interfaces such as IEEE 802.11, Bluetooth™, or radio interfaces for accessing cellular telephone networks (e.g., transceiver/antenna for accessing a CDMA, GSM, UMTS, or other mobile communications network). In some examples, the communication device can use acoustic waves, surface waves, vibrations, optical waves, or induction (e.g., magnetic induction) for engaging in wireless communications. In an example in which the communication device is wired, the communications device can include interfaces such as Ethernet, USB, IEEE 1394, or a fiber optic interface. In an example with at least one other computing device, the computing device 104 can receive wired or wireless communications from the other computing device and perform one or more tasks based on the communications.

In an example in which the operation is an exploration operation, the transmitter 109 and the sensor 110 may be positioned at the surface 102 for sending or receiving a set of signals into the subterranean formation 100. The signals may be transmitted by the transmitter 109 and may be electromagnetic signals, acoustic signals, or other suitable types of signals for determining the likelihood of fluid-type in the subterranean reservoirs 106. The signals may reflect off of, or otherwise return from, at least one of the subterranean reservoirs 106 and may be received by the sensor 110. The sensor 110 may generate, based on the received signals, pre-stack seismic data that includes geometric locations within the subterranean reservoirs 106, angles of reflection from the geometric locations, offset values, and the like. In some examples, the computing device 104 sends the signals instead of, or in addition to, the transmitter 109. In response to receiving the signals and generating the pre-stack seismic data, the sensor 110 may be configured to send the pre-stack seismic data to the computing device 104, and the computing device 104 may receive the pre-stack seismic data from the sensor 110. In some examples, the sensor 110 receives the signals, transmits the signals to the computing device 104, and the computing device 104, rather than the sensor 110, generates the pre-stack seismic data.

The computing device 104 may use the pre-stack seismic data to determine a likelihood of fluid-type in at least one of the subterranean reservoirs 106, and in some examples, the computing device 104 may determine the likelihood of fluid-type in more than one subterranean reservoir 106a-e during the operation. Additionally, the computing device 104 may use the pre-stack seismic data to determine a list of features that affect the likelihood of fluid-type in the subterranean reservoirs 106. In some examples, alternative to the computing device 104 determining the likelihood and the list of features, the computing device 104 may transmit the pre-stack seismic data to an offsite facility (not shown) for determining the likelihood and the list of features. In this example, the offsite facility may transmit the determined likelihood of fluid-type and the list of features to the computing device 104. In response to determining or receiving the likelihood of fluid-type in the subterranean reservoirs 106 and the list of features affecting the likelihood, the computing device 104 may output the likelihood and the list of features. The output likelihood and the output list of features may be displayed by the computing device 104 for viewing by an operator, or a supervisor, of the operation. The output likelihood and the output list of features may be used to model the subterranean reservoirs 106 or for performing other tasks related to exploration of the subterranean formation 100.

Figure 2:
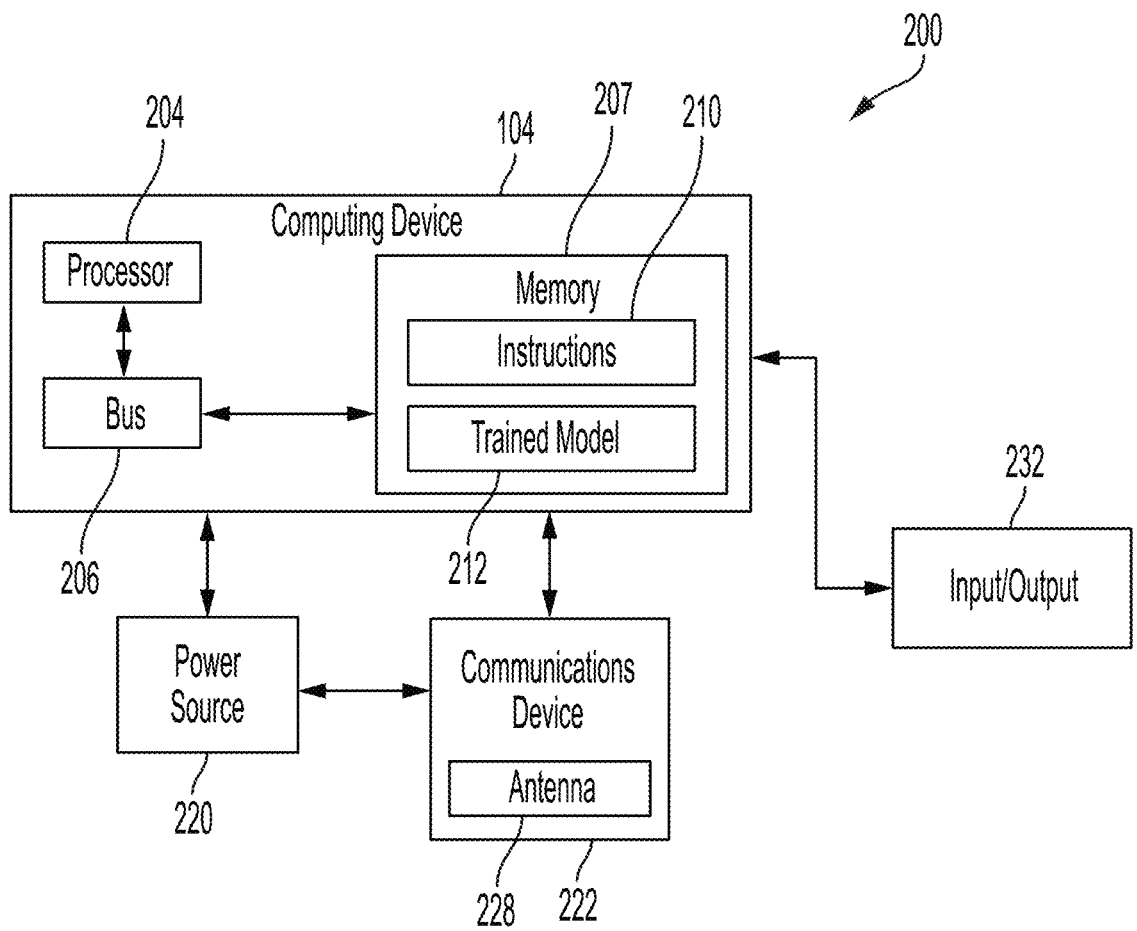
FIG. 2 is a block diagram of a computing system for determining a likelihood of fluid-type in a subterranean reservoir and associated influencing features according to one example of the present disclosure.

FIG. 2 is a block diagram of a computing system 200 for determining a likelihood of fluid-type in a subterranean reservoir 106 and a list of features affecting the likelihood, according to one example of the present disclosure. The components shown in FIG. 2 (e.g. the computing device 104, power source 220, etc.) can be integrated into a single structure. For example, the components can be within a single housing. In other examples, the components shown in FIG. 2 can be distributed via separate housings or otherwise, and in electrical communication with each other.

The system 200 may include the computing device 104. The computing device 104 can include a processor 204 interfaced with other hardware via a bus 206. A memory 207, which can include any suitable tangible (and non-transitory) computer-readable medium, such as random-access memory ("RAM"), read-only memory ("ROM"), electrically erasable and programmable read-only memory ("EEPROM"), or the like, can embody program components that configure operation of the computing device 104. In some aspects, the computing device 104 can include input/output interface components (e.g., a display, printer, keyboard, touch-sensitive surface, and mouse) and additional storage.

The processor 204 can execute one or more operations for determining a likelihood of fluid-type in the subterranean reservoir 106 and a list of features affecting the likelihood. For example, the processor 204 can determine, based on pre-stack seismic data from the subterranean reservoir 106, the likelihood of fluid-type in the subterranean reservoir 106 by executing a trained model 212 on input features calculated for the pre-stack seismic data. The trained model 212 may be included in the memory 207. The instructions 210 may include other suitable instructions for determining the fluid-type in the subterranean reservoir 106 and the list of features affecting the likelihood. The processor 204 can execute instructions stored in the memory 207 to perform the operations. The processor 204 can include one processing device or multiple processing devices or cores. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the bus 206. The memory 207 may be non-volatile and may include any type of memory device that retains stored information when powered off. Non-limiting examples of the memory 207 include EEPROM, flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, RAM, an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The computing system 200 can include a power source 220. The power source 220 can be in electrical communication with the computing device 104 that may include a communications device 222. In some examples, the power source 220 can include a battery or an electrical cable (e.g., a wireline). The power source 220 can include an AC signal generator. The computing device 104 can operate the power source 220 to apply a transmission signal to an antenna 228, in an example in which the communications device 222 is operating in a wireless mode, to forward data relating to the subterranean reservoir 106, etc. to other systems. For example, the computing device 104 can cause the power source 220 to apply a voltage with a frequency within a specific frequency range to the antenna 228. This can cause the antenna 228 to generate a wireless transmission. In other examples, the computing device 104, rather than the power source 220, can apply the transmission signal to the antenna 228 for generating the wireless transmission.

In some examples, part of the communications device 222 can be implemented in software. For example, the communications device 222 can include additional instructions stored in memory 207 for controlling functions of the communications device 222. The communications device 222 can receive signals from remote devices and transmit data to remote devices. For example, the communications device 222 can transmit wireless communications that are modulated by data via the antenna 228. In some examples, the communications device 222 can receive signals (e.g. associated with data to be transmitted) from the processor 204 and amplify, filter, modulate, frequency shift, or otherwise manipulate the signals. In some examples, the communications device 222 can transmit the manipulated signals to the antenna 228. The antenna 228 can receive the manipulated signals and responsively generate wireless communications that carry the data.

The computing system 200 can control and receive input from the sensor 110. The sensor 110 may receive or otherwise generate pre-stack seismic data about the subterranean reservoir 106 via received signals from the subterranean formation 100. The computing system 200 can additionally include an input/output interface 232. The input/output interface 232 can connect to a keyboard, pointing device, display, and other computer input/output devices. An operator may provide input using the input/output interface 232. Additionally or alternatively, the operator may view outputs from the computing device 104 on the input/output interface 232. The likelihood of fluid-type in the subterranean reservoir 106 and associated influencing features may be displayed to the operator on the input/output interface 232. The displayed likelihood and associated features can provide an advisory function to the operator, or to the supervisor, of an operation using the computing system 200, either of whom can make adjustments to the operation based on the displayed likelihood and the list of features affecting the likelihood. In one example, in response to viewing the likelihood and the list of features affecting the likelihood, the operator may generate a model of the subterranean reservoir 106 for a hydrocarbon exploration operation and may recommend or not recommend drilling a hydrocarbon well into the subterranean reservoir 106 for extracting produced hydrocarbon based on the output.

Figure 3:
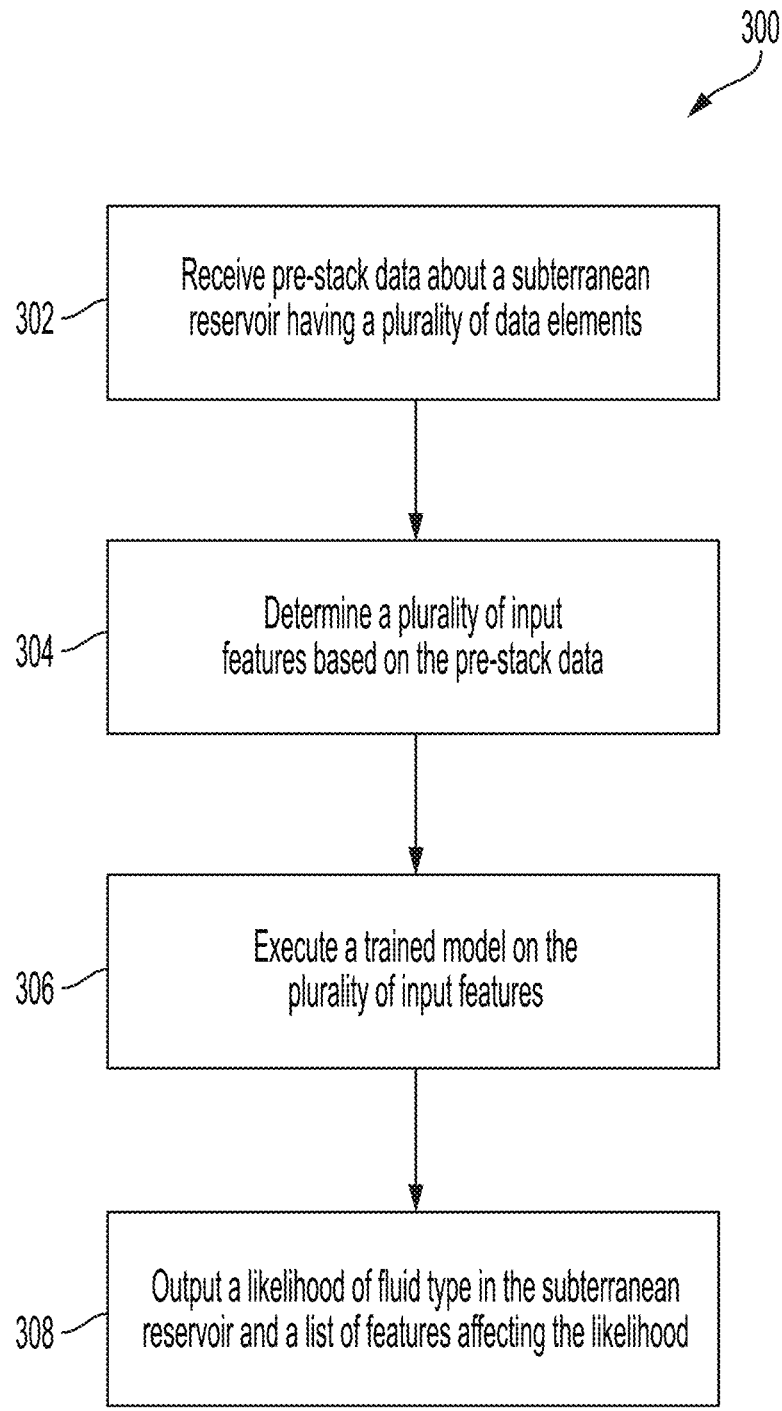
FIG. 3 is a flow chart of a process for determining a likelihood of fluid-type in a subterranean reservoir according to one example of the present disclosure.

FIG. 3 is a flow chart of a process 300 for determining a likelihood of fluid-type in a subterranean reservoir 106 and a list of features affecting the likelihood, according to one example of the present disclosure. At block 302, the computing device 104 of an exploration operation receives pre-stack seismic data about the subterranean reservoir 106. The pre-stack seismic data may include a set of data elements such as geometric locations within the subterranean reservoir 106, angles of reflection from the geometric locations, offset values from the geometric locations, amplitudes, a combination thereof, and the like. The pre-stack seismic data may be received from the sensor 110, and, in some examples, the pre-stack seismic data may be generated by the computing device 104 in response to receiving signals from the sensor 110. The pre-stack seismic data may be about a single subterranean reservoir 106, and, in other examples, the pre-stack seismic data may include data about more than one subterranean reservoir 106.

At block 304, the computing device 104 determines input features based on the pre-stack seismic data received at block 302. The input features may be determined for each geometric location and for each data element like angle of reflection or offset value. The input features may include an amplitude for each angle or for each offset included in the pre-stack seismic data, an amplitude frequency, a set of structural features such as lithography or rock total compressibility of the subterranean reservoir 106, and entropy that is a measure of heat transfer in the subterranean reservoir 106. A subset of these input features may be determined, and other suitable input features may be determined for determining the likelihood. The input features may be generated using time-series data processing techniques. For example, the computing device 104 may treat input features, such as geometric location and angle of reflection, as time and progress through the process 300 or otherwise process data accordingly.

At block 306, the computing device 104 executes a trained model on the input features. The trained model may be an explainable artificial intelligence, or machine learning, algorithm. In executing the trained model on the input features, the computing device 104 may determine the likelihood of fluid-type in the subterranean reservoir 106. Some fluids that may be included in the subterranean reservoir 106 include oil, natural gas, water, and the like. In some examples, other hydrocarbon material such as coal may be included in the subterranean reservoir 106. The input features may each affect or otherwise influence the likelihood of fluid-type in the subterranean reservoir 106 differently. Executing the trained model on the input features may allow the computing device 104 to determine levels of influence that the input features assert and output them as a list of features affecting the likelihood of fluid-type in the subterranean reservoir 106.

At block 308, the computing device 104 outputs the likelihood of fluid-type in the subterranean reservoir 106 and a list of features affecting the likelihood. In response to executing the trained model on the input features, the computing device 104 may output the likelihood of fluid-type. The likelihood of fluid-type may be influenced by each of the input features differently, and the computing device 104 can output the input features that affect the likelihood prediction subsequent to executing the trained model on the input features. The output likelihood of fluid-type and list of features affecting the fluid-type may be subsequently used for hydrocarbon exploration. The output likelihood of fluid-type and list of features affecting the fluid-type may be used for other exploration operations such as water well exploration.

Figure 4:
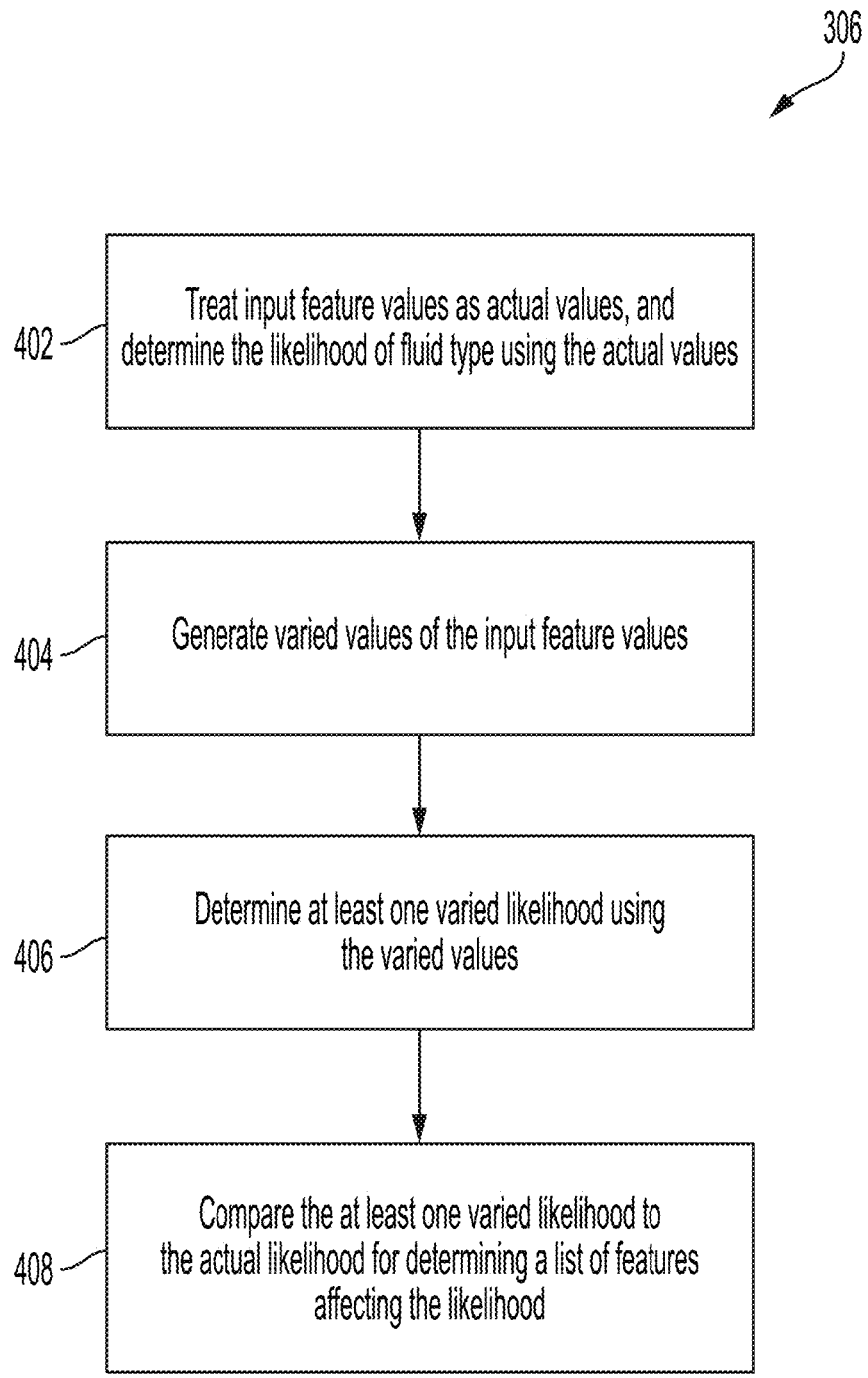
FIG. 4 is a flow chart of a process for determining a list of features that influence the likelihood of fluid-type in a subterranean reservoir according to one example of the present disclosure.

FIG. 4 is a flow chart of a process 400 for determining a list of features that influence a prediction of fluid-type in a subterranean reservoir, according to one example of the present disclosure. At block 402, the computing device 104 treats input feature values as actual values and determines the likelihood of fluid-type in the subterranean reservoir 106 using the actual values. The likelihood of fluid-type determined at block 402 may be output by the computing device 104 for subsequent use in exploration operations.

At block 404, the computing device 104 generates varied values of the input features. The computing device 104, for each actual value of the input features, may generate a set of varied values of the input features that includes values greater than the actual value and values less than the actual value. In some examples, the varied values will include three varied values above the actual value and three varied values below the actual value. Other suitable number of varied values may be used for the process 400. The varied values may be subsequently used for determining likelihoods.

At block 406, the computing device 104 determines at least one varied likelihood of fluid-type in the subterranean reservoir 106 using the varied values. The computing device 104 can determine likelihoods of fluid-type in the subterranean reservoir 106 using the varied values of the input features. In some examples, the computing device 104 may determine one varied likelihood based on the varied values, and in other examples, the computing device 104 may determine varied likelihoods for a subset of the varied values that includes more than one likelihood. The computing device 104 may subsequently use the at least one varied likelihood of fluid-type for comparison.

At block 408, the computing device 104 compares the actual likelihood of fluid-type in the subterranean reservoir 106 to the at least one varied likelihood of fluid-type in the subterranean reservoir 106 for determining and outputting the list of features affecting the likelihood of fluid-type in the subterranean reservoir 106. Each varied likelihood of the at least one varied likelihood may be compared to the actual likelihood by the computing device 104. In some examples, input features with varied likelihoods that are substantially different than the actual likelihood may be more influential in determining the likelihood of fluid-type in the subterranean reservoir 106 than input features with varied likelihoods that are not substantially different than the actual likelihood. In response to performing the comparison, the computing device 104 may compile and output the list of features affecting the likelihood of fluid-type in the subterranean reservoir 106 and organize the list in descending order of influence. The list of features may include a subset of the input features used to determine the actual likelihood of fluid-type in the subterranean reservoir 106.

Figure 5:
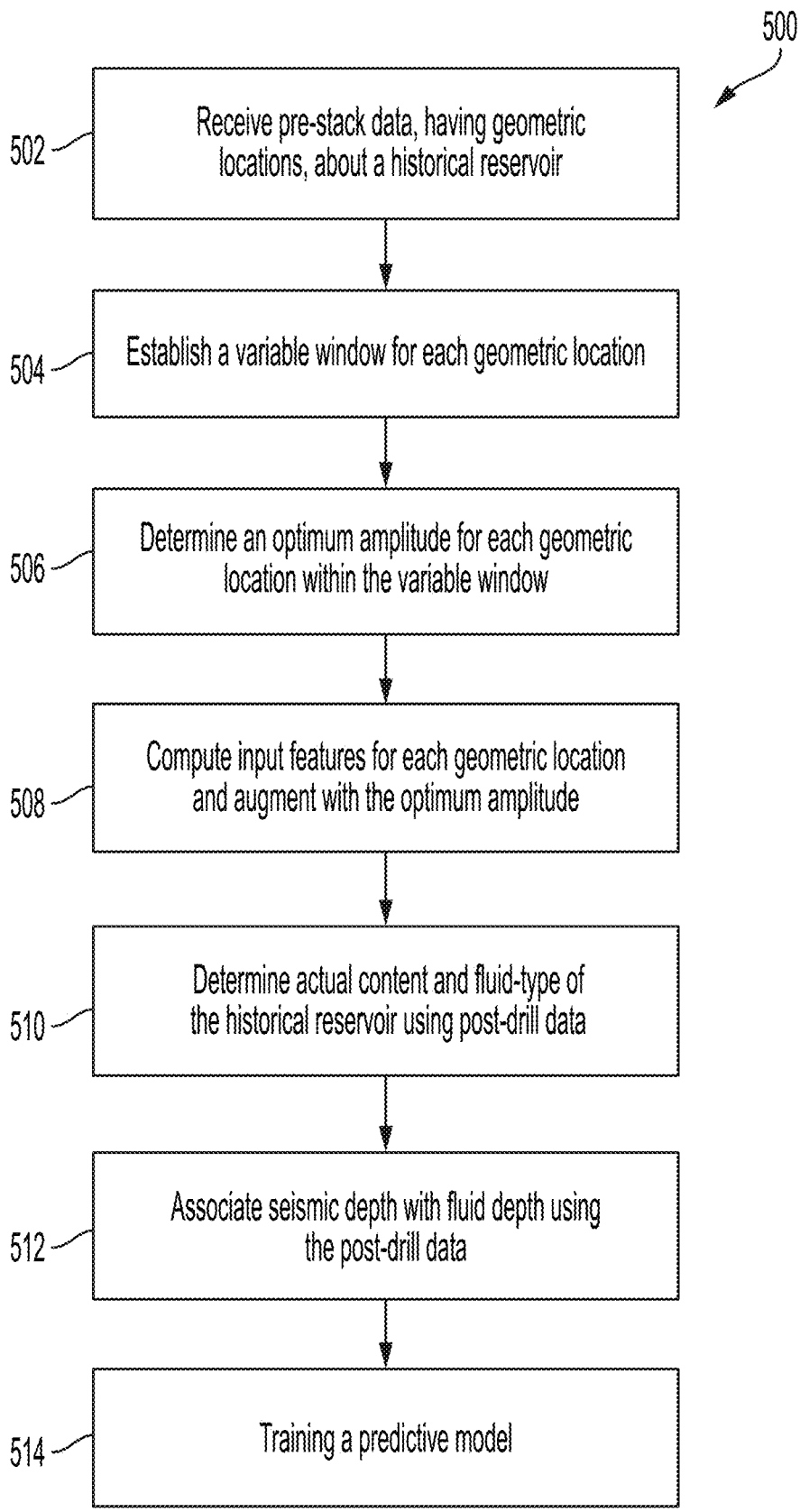
FIG. 5 is a flow chart of a process for training a predictive model for determining a likelihood of fluid-type in a subterranean reservoir according to one example of the present disclosure.

FIG. 5 is a flow chart of a process 500 for training a predictive model for determining a likelihood of fluid-type in a subterranean reservoir 106, according to one example of the present disclosure. At block 502, the computing device 104 receives pre-stack seismic data including geometric locations about a historical subterranean reservoir. The pre-stack seismic data may include a set of data elements such as geometric locations within the historical subterranean reservoir, angles of reflection from the geometric locations, offset values from the geometric locations, amplitudes, a combination thereof, and the like. The computing device 104 may receive the pre-stack seismic data from post-drill data about the historical subterranean reservoir.

At block 504, the computing device 104 establishes a variable window for each geometric location included in the pre-stack seismic data. The geometric locations included in the pre-stack seismic data may not be accurate due to uncertainty or other error in measurement. A curve associated with the received geometric locations may be jagged and not continuous. To remedy this, the computing device 104 may establish the variable window. For each geometric location, the variable window may be of length seven meaning that there are three sample geometric location values greater than each geometric location and three sample geometric location values less than each geometric location. Other suitable variable window lengths may be used for training the predictive model. Within the variable window, the geometric location values may be identical or may differ, and the variable window may include a known seismic polarity. The seismic polarity may be positive or negative. The variable window may be used by the computing device 104 to determine an optimum amplitude for each geometric location, and this may smooth the curve associated with the geometric locations and make values of the geometric locations more accurate.

At block 506, the computing device 104 determines the optimum amplitude for each geometric location within the established variable window. The optimum amplitude for each geometric location within the establish variable window may be a minimum amplitude or a maximum amplitude. The known seismic polarity of the variable window may imply whether the optimum amplitude is the maximum amplitude or the minimum amplitude. For example, if the seismic polarity of the variable window is negative, then the computing device 104 may select the minimum amplitude in the variable window as the optimum amplitude. In response to determining the optimum amplitude, the computing device 104 may set the actual amplitude of the geometric location as the optimum amplitude.

At block 508, the computing device 104 computes input features for each geometric location and augments the computed input features with the determined optimum amplitude for each geometric location. The input features may include an amplitude frequency, a set of structural features such as lithography or rock total compressibility of the subterranean reservoir 106, and entropy that is a measure of heat transfer in the subterranean reservoir 106. A subset of these input features may be used, and other suitable input features may be used. Subsequent to determining the input features, the computing device 104 may augment the input features with the determined optimum amplitude of each geometric location.

At block 510, the computing device 104 determines actual content and fluid-type in the historical subterranean reservoir using post-drill data. The post-drill data may include a value representing an amount of produced material from the historical subterranean reservoir. The produced material from the historical subterranean reservoir may include oil, natural gas, water, coal, and the like. The computing device 104, using the post-drill data, may determine actual amounts of each material that existed in, or were extract from, the historical subterranean reservoir for subsequent use in training the predictive model.

At block 512, the computing device 104 associates seismic depth with fluid depth in the historical subterranean reservoir using the post-drill data. Seismic depth in this example may be a measured depth or geometric location within the historical subterranean reservoir, and fluid depth may be an actual depth of certain fluid-types in the historical subterranean reservoir. In some examples, the seismic depth of the subterranean reservoir 106 may not be the same as the fluid depth of fluid in the subterranean reservoir 106. This can be due to uncertainty associated with measuring equipment, features in the subterranean formation 100, and the like. Associating the seismic depth with the fluid depth in the historical subterranean reservoir may improve the effectiveness of the predictive trained model by allowing the predictive trained model to output a more accurate likelihood prediction.

At block 514, the computing device 104 trains a predictive model using the input features and the post-drill data. Using the input features determined at block 508 and the post-drill data, the computing device 104 can train the predictive model for subsequent use in determining the likelihood of fluid-type in the subterranean reservoir 106 and the associated list of influencing features. The post-drill data used for training the predictive model can include the actual content and fluid-type of the historical subterranean reservoir, and the associated seismic depth and fluid depth of the actual fluid in the historical subterranean reservoir, etc. Other types of post-drill data may be used for training the predictive model. Training the predictive model may involve mapping inputs of the predictive model to known outputs of the predictive model. In response to training the predictive model, the computing device 104 may store the predictive model for subsequent use in determining the likelihood of fluid-type in the subterranean reservoir 106 and the associated list of influencing features.

Figure 6:
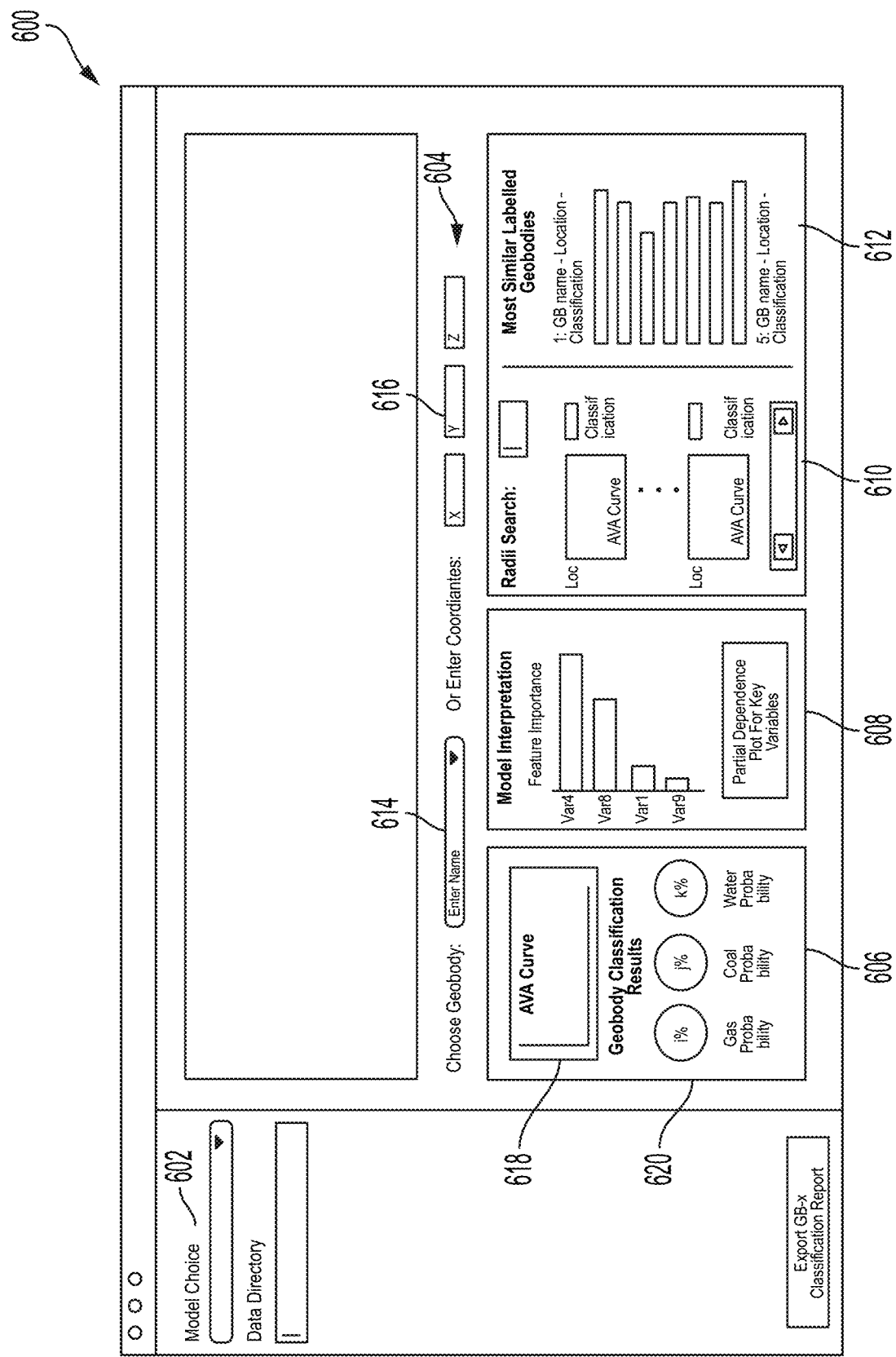
FIG. 6 is an example of a user interface generated by a system for determining a likelihood of fluid-type in a subterranean reservoir and an associated list of influencing features according to one example of the present disclosure.

FIG. 6 is an exemplary user interface 600 generated by a computing device 104 for determining a likelihood of fluid-type in the subterranean reservoir 106 and the list of features affecting the likelihood, according to one example of the present disclosure. The user interface 600 as illustrated includes a model choice 602, a geolocation selector 604, a likelihood results panel 606, a list of important features panel 608, a radii search panel 610, and a similar geo-body panel 612. The model choice 602 may be a drop-down selection tool that may allow a user of the user interface 600 to choose the model to use in the user interface 600. In some examples, the model may be the predictive model trained in the process 500. Using the model choice 602 may cause the computing device 104 to perform the process 300 for determining the likelihood of fluid-type in the subterranean reservoir 106.

The geolocation selector 604 is illustrated in the middle of the user interface 600 and includes a geo-body option 614 and a geolocation input 616. When selected, the geo-body option 614 may display a drop-down menu for selecting pre-loaded geo-bodies for which the computing device 104 can determine the likelihood of fluid-type. The geolocation input 616 can allow the user of the user interface 600 to input a geolocation, a set of geolocations, a location of a geo-body, or the like. The computing device 104 can receive the input from the geolocation input 616 and may output the likelihood of fluid-type at the input location.

The likelihood results panel 606 is illustrated on the bottom left portion of the user interface 600 and includes a space for an AVA curve 618 and geo-body classification results 620. The AVA curve 618 may be a plot of amplitude versus angle data received by the computing device 104 from at least one subterranean reservoir 106. In some examples, the computing device 104 may display the AVA curve 618 in response to receiving input from the geolocation input 616. Illustrated underneath the AVA curve 618 on the user interface 600 are the geo-body classification results 620 that include a list of fluid-types that may be present in the selected geo-body. In some examples, the selected geo-body may be the subterranean reservoir 106. The user interface 600 may display the classification results 620 as a name of the fluid-type and an associated percentage representing the likelihood of fluid-type in the selected geo-body.

The list of important features panel 608 is illustrated on the user interface 600 on the middle bottom portion of the user interface 600 and includes a list of features affecting the likelihood of fluid-type in the selected geo-body. The computing device 104 may display the important features on the user interface 600 as a bar graph and organize the important features in descending order of influence in determining the likelihood of fluid-type in the selected geo-body. The computing device 104 may display the important features in other suitable manners for conveying the list of important features to the user of the user interface 600.

Illustrated on the bottom right portion of the user interface 600 are the radii search panel 610 and the similar geo-body panel 612. The radii search panel 610 may allow the user of the user interface 600 to search for geo-bodies within an input radius value for comparing the likelihood of fluid in the selected geo-body to the likelihood of fluid in the geo-bodies within the input radius. The similar geo-body panel 612 may display geo-bodies that include similar fluid compositions compared to the selected geo-body. The computing device 104 may display a name of a similar geo-body, a location of the similar geo-body, a classification of the similar geo-body, a likelihood, or actual content, of fluid in the similar geo-body, and the like.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a non-transitory computer-readable medium comprising instructions that are executable by the processor to cause the processor to perform operations comprising: receiving pre-stack seismic data that includes a plurality of data elements that are seismically acquired for a plurality of geometric locations with respect to a subterranean reservoir; determining, using the pre-stack seismic data, a plurality of input features for each geometric location of the plurality of geometric locations, the plurality of input features representing at least one characteristic of the pre-stack seismic data; executing a trained model on values of the plurality of input features to determine a likelihood of a type of fluid in the subterranean reservoir and to determine a list of features affecting the likelihood; and outputting the likelihood and the list of features.

Example 2 is the system of example 1, wherein the operation of executing the trained model on values of the plurality of input features to determine the likelihood of the type of fluid in the subterranean reservoir and to determine the list of features affecting the likelihood includes: treating the values as actual values for the plurality of input features and determining the likelihood using the actual values; generating varied values for the plurality of input features by varying one or more values for the plurality of input features; determining, using the varied values for the plurality of input features, at least one varied likelihood of the type of fluid in the subterranean reservoir; and comparing the at least one varied likelihood to the likelihood to determine the list of features affecting the likelihood.

Example 3 is the system of any of examples 1 and 2, wherein the list of features includes features listed in the order of relative influence in determining the likelihood of the type of fluid in the subterranean reservoir.

Example 4 is the system of example 1, wherein the plurality of input features includes an amplitude for each reflection angle of a plurality of reflection angles or for each offset of a plurality of offsets, amplitude frequency, structural features including lithology and rock total compressibility of the subterranean reservoir, and entropy that is a measure of heat transfer of the subterranean reservoir, and wherein the input features are generated from the pre-stack seismic data via data processing techniques in which each geographic location, and each angle or each offset are treated as time for the data processing techniques.

Example 5 is the system of example 1, wherein the operation of determining the plurality of input features includes determining a plurality of input features for each data element of the plurality of data elements.

Example 6 is the system of example 1, wherein the trained model is a predictive model trained via a training process that includes: receiving pre-stack seismic data about a historical subterranean reservoir, the pre-stack seismic data including a plurality of historic geometric locations; establishing a variable window having a known seismic polarity for each historic geometric location within the plurality of historic geometric locations included in the pre-stack seismic data; determining an optimum amplitude value for each geometric location within the variable window having the known seismic polarity, the optimum amplitude value being a minimum amplitude or a maximum amplitude; computing a plurality of historic input features for each geometric location within the plurality of geometric locations, the plurality of historic input features including the optimum amplitude value, structural features including lithology and rock total compressibility of the historical subterranean reservoir, and entropy that is a measure of heat transfer of the historical subterranean reservoir; determining, from post-drill data about the historical subterranean reservoir, content and type of fluid in the historical subterranean reservoir; associating seismic depth and fluid depth using the post-drill data; and training the predictive model by using post-drill data about content and type of fluid in the historical subterranean reservoir and the computed plurality of historic input features.

Example 7 is the system of example 1, wherein the operation of executing a trained model on values of the plurality of input features to determine a likelihood of a type of fluid in the subterranean reservoir and to determine a list of features affecting the likelihood includes analyzing amplitude versus angle (AVA) and amplitude versus offset (AVO) plots for different fluid of coal pattern recognition for predicting fluid likelihood in the subterranean reservoir.

Example 8 is a method comprising: receiving pre-stack seismic data that includes a plurality of data elements that are seismically acquired for a plurality of geometric locations with respect to a subterranean reservoir; determining, using the pre-stack seismic data, a plurality of input features for each geometric location of the plurality of geometric locations, the plurality of input features representing at least one characteristic of the pre-stack seismic data; executing a trained model on values of the plurality of input features to determine a likelihood of a type of fluid in the subterranean reservoir and to determine a list of features affecting the likelihood; and outputting the likelihood and the list of features.

Example 9 is the method of example 8, wherein the operation of executing the trained model on values of the plurality of input features to determine the likelihood of the type of fluid in the subterranean reservoir and to determine the list of features affecting the likelihood includes: treating the values as actual values for the plurality of input features and determining the likelihood using the actual values; generating varied values for the plurality of input features by varying one or more values for the plurality of input features; determining, using the varied values for the plurality of input features, at least one varied likelihood of the type of fluid in the subterranean reservoir; and comparing the at least one varied likelihood to the likelihood to determine the list of features affecting the likelihood.

Example 10 is the method of any of examples 8 and 9, wherein the list of features includes features listed in the order of relative influence in determining the likelihood of the type of fluid in the subterranean reservoir.

Example 11 is the method of example 8, wherein the plurality of input features includes an amplitude for each reflection angle of a plurality of reflection angles or for each offset of a plurality of offsets, amplitude frequency, structural features including lithology and rock total compressibility of the subterranean reservoir, and entropy that is a measure of heat transfer of the subterranean reservoir, and wherein the input features are generated from the pre-stack seismic data via data processing techniques in which each geographic location, and each angle or each offset are treated as time for the data processing techniques.

Example 12 is the method of example 8, wherein the operation of determining the plurality of input features includes determining a plurality of input features for each data element of the plurality of data elements.

Example 13 is the method of example 8, wherein the trained model is a predictive model trained via a training process that includes: receiving pre-stack seismic data about a historical subterranean reservoir, the pre-stack seismic data including a plurality of historic geometric locations; establishing a variable window having a known seismic polarity for each historic geometric location within the plurality of historic geometric locations included in the pre-stack seismic data; determining an optimum amplitude value for each geometric location within the variable window having the known seismic polarity, the optimum amplitude value being a minimum amplitude or a maximum amplitude; computing a plurality of historic input features for each geometric location within the plurality of geometric locations, the plurality of historic input features including the optimum amplitude value, structural features including lithology and rock total compressibility of the historical subterranean reservoir, and entropy that is a measure of heat transfer of the historical subterranean reservoir; determining, from post-drill data about the historical subterranean reservoir, content and type of fluid in the historical subterranean reservoir; associating seismic depth and fluid depth using the post-drill data; and training the predictive model by using post-drill data about content and type of fluid in the historical subterranean reservoir and the computed plurality of historic input features.

Example 14 is the method of example 8, wherein the operation of executing a trained model on values of the plurality of input features to determine a likelihood of a type of fluid in the subterranean reservoir and to determine a list of features affecting the likelihood includes analyzing amplitude versus angle (AVA) and amplitude versus offset (AVO) plots for different fluid of coal pattern recognition for predicting fluid likelihood in the subterranean reservoir.

Example 15 is a non-transitory computer-readable medium comprising instructions that are executable by a processing device for causing the processing device to perform operations comprising: receiving pre-stack seismic data that includes a plurality of data elements that are seismically acquired for a plurality of geometric locations with respect to a subterranean reservoir; determining, using the pre-stack seismic data, a plurality of input features for each geometric location of the plurality of geometric locations, the plurality of input features representing at least one characteristic of the pre-stack seismic data; executing a trained model on values of the plurality of input features to determine a likelihood of a type of fluid in the subterranean reservoir and to determine a list of features affecting the likelihood; and outputting the likelihood and the list of features.

Example 16 is the non-transitory computer-readable medium of example 15, wherein the operation of executing the trained model on values of the plurality of input features to determine the likelihood of the type of fluid in the subterranean reservoir and to determine the list of features affecting the likelihood includes: treating the values as actual values for the plurality of input features and determining the likelihood using the actual values; generating varied values for the plurality of input features by varying one or more values for the plurality of input features; determining, using the varied values for the plurality of input features, at least one varied likelihood of the type of fluid in the subterranean reservoir; and comparing the at least one varied likelihood to the likelihood to determine the list of features affecting the likelihood.

Example 17 is the non-transitory computer-readable medium of any of examples 15 and 16, wherein the list of features includes features listed in the order of relative influence in determining the likelihood of the type of fluid in the subterranean reservoir.

Example 18 is the non-transitory computer-readable medium of example 15, wherein the plurality of input features includes an amplitude for each reflection angle of a plurality of reflection angles or for each offset of a plurality of offsets, amplitude frequency, structural features including lithology and rock total compressibility of the subterranean reservoir, and entropy that is a measure of heat transfer of the subterranean reservoir, and wherein the input features are generated from the pre-stack seismic data via data processing techniques in which each geographic location, and each angle or each offset are treated as time for the data processing techniques.

Example 19 is the non-transitory computer-readable medium of example 15, wherein the operation of determining the plurality of input features includes determining a plurality of input features for each data element of the plurality of data elements.

Example 20 is the non-transitory computer-readable medium of example 15, wherein the trained model is a predictive model trained via a training process that includes: receiving pre-stack seismic data about a historical subterranean reservoir, the pre-stack seismic data including a plurality of historic geometric locations; establishing a variable window having a known seismic polarity for each historic geometric location within the plurality of historic geometric locations included in the pre-stack seismic data; determining an optimum amplitude value for each geometric location within the variable window having the known seismic polarity, the optimum amplitude value being a minimum amplitude or a maximum amplitude; computing a plurality of historic input features for each geometric location within the plurality of geometric locations, the plurality of historic input features including the optimum amplitude value, structural features including lithology and rock total compressibility of the historical subterranean reservoir, and entropy that is a measure of heat transfer of the historical subterranean reservoir; determining, from post-drill data about the historical subterranean reservoir, content and type of fluid in the historical subterranean reservoir; associating seismic depth and fluid depth using the post-drill data; and training the predictive model by using post-drill data about content and type of fluid in the historical subterranean reservoir and the computed plurality of historic input features.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processor; and
a non-transitory computer-readable medium comprising instructions that are executable by the processor to cause the processor to perform operations comprising:
receiving pre-stack seismic data that includes a plurality of data elements that are seismically acquired for a plurality of geometric locations with respect to a subterranean reservoir;
determining, using the pre-stack seismic data, a plurality of input features for each geometric location of the plurality of geometric locations, the plurality of input features representing at least one characteristic of the pre-stack seismic data;
training a machine-learning model by using post-drill data about content and type of fluid in a historical subterranean reservoir and a computed plurality of historic input features that include (i) lithology and rock total compressibility of the historical subterranean reservoir, and (ii) entropy that is a measure of heat transfer of the historical subterranean reservoir;
executing the trained machine-learning model on values of the plurality of input features to determine a likelihood of a type of fluid in the subterranean reservoir and to determine a list of features affecting the likelihood; and
outputting the likelihood and the list of features.

2. The system of claim 1, wherein the operation of executing the trained machine-learning model on values of the plurality of input features to determine the likelihood of the type of fluid in the subterranean reservoir and to determine the list of features affecting the likelihood includes:
treating the values as actual values for the plurality of input features and determining the likelihood using the actual values;
generating varied values for the plurality of input features by varying one or more values for the plurality of input features;
determining, using the varied values for the plurality of input features, at least one varied likelihood of the type of fluid in the subterranean reservoir; and
comparing the at least one varied likelihood to the likelihood to determine the list of features affecting the likelihood.

3. The system of claim 2, wherein the list of features includes features listed in the order of relative influence in determining the likelihood of the type of fluid in the subterranean reservoir.

4. The system of claim 1, wherein the plurality of input features includes an amplitude for each reflection angle of a plurality of reflection angles or for each offset of a plurality of offsets, amplitude frequency, structural features including lithology and rock total compressibility of the subterranean reservoir, and entropy that is a measure of heat transfer of the subterranean reservoir, and wherein the input features are generated from the pre-stack seismic data via data processing techniques in which each geographic location, and each angle or each offset are treated as time for the data processing techniques.

5. The system of claim 1, wherein the operation of determining the plurality of input features includes determining a plurality of input features for each data element of the plurality of data elements.

6. The system of claim 1, wherein the trained machine-learning model is a predictive model trained via a training process that includes:
receiving pre-stack seismic data about a historical subterranean reservoir, the pre-stack seismic data including a plurality of historic geometric locations;

establishing a variable window having a known seismic polarity for each historic geometric location within the plurality of historic geometric locations included in the pre-stack seismic data;

determining an optimum amplitude value for each geometric location within the variable window having the known seismic polarity, the optimum amplitude value being a minimum amplitude or a maximum amplitude;

determining, from post-drill data about the historical subterranean reservoir, content and type of fluid in the historical subterranean reservoir;

associating seismic depth and fluid depth using the post-drill data; and training the predictive model by using post-drill data about content and type of fluid in the historical subterranean reservoir and the computed plurality of historic input features.

7. The system of claim 1, wherein the operation of executing a trained model on values of the plurality of input features to determine a likelihood of a type of fluid in the subterranean reservoir and to determine a list of features affecting the likelihood includes analyzing amplitude versus angle (AVA) and amplitude versus offset (AVO) plots for different fluid of coal pattern recognition for predicting fluid likelihood in the subterranean reservoir.

8. A method comprising:

receiving pre-stack seismic data that includes a plurality of data elements that are seismically acquired for a plurality of geometric locations with respect to a subterranean reservoir;

determining, using the pre-stack seismic data, a plurality of input features for each geometric location of the plurality of geometric locations, the plurality of input features representing at least one characteristic of the pre-stack seismic data;

training a machine-learning model by using post-drill data about content and type of fluid in a historical subterranean reservoir and a computed plurality of historic input features that include (i) lithology and rock total compressibility of the historical subterranean reservoir, and (ii) entropy that is a measure of heat transfer of the historical subterranean reservoir;

executing the trained machine-learning model on values of the plurality of input features to determine a likelihood of a type of fluid in the subterranean reservoir and to determine a list of features affecting the likelihood; and outputting the likelihood and the list of features.

9. The method of claim 8, wherein executing the trained machine-learning model on values of the plurality of input features to determine the likelihood of the type of fluid in the subterranean reservoir and to determine the list of features affecting the likelihood includes:

treating the values as actual values for the plurality of input features and determining the likelihood using the actual values;

generating varied values for the plurality of input features by varying one or more values for the plurality of input features;

determining, using the varied values for the plurality of input features, at least one varied likelihood of the type of fluid in the subterranean reservoir; and comparing the at least one varied likelihood to the likelihood to determine the list of features affecting the likelihood.

10. The method of claim 9, wherein the list of features includes features listed in the order of relative influence in determining the likelihood of the type of fluid in the subterranean reservoir.

11. The method of claim 8, wherein the plurality of input features includes an amplitude for each reflection angle of a plurality of reflection angles or for each offset of a plurality of offsets, amplitude frequency, structural features including lithology and rock total compressibility of the subterranean reservoir, and entropy that is a measure of heat transfer of the subterranean reservoir, and wherein the input features are generated from the pre-stack seismic data via data processing techniques in which each geographic location, and each angle or each offset are treated as time for the data processing techniques.

12. The method of claim 8, wherein determining the plurality of input features includes determining a plurality of input features for each data element of the plurality of data elements.

13. The method of claim 8, wherein the trained machine-learning model is a predictive model trained via a training process that includes:

receiving pre-stack seismic data about a historical subterranean reservoir, the pre-stack seismic data including a plurality of historic geometric locations;

establishing a variable window having a known seismic polarity for each historic geometric location within the plurality of historic geometric locations included in the pre-stack seismic data;

determining an optimum amplitude value for each geometric location within the variable window having the known seismic polarity, the optimum amplitude value being a minimum amplitude or a maximum amplitude;

determining, from post-drill data about the historical subterranean reservoir, content and type of fluid in the historical subterranean reservoir;

associating seismic depth and fluid depth using the post-drill data; and training the predictive model by using post-drill data about content and type of fluid in the historical subterranean reservoir and the computed plurality of historic input features.

14. The method of claim 8, wherein executing a trained model on values of the plurality of input features to determine a likelihood of a type of fluid in the subterranean reservoir and to determine a list of features affecting the likelihood includes analyzing amplitude versus angle (AVA) and amplitude versus offset (AVO) plots for different fluid of coal pattern recognition for predicting fluid likelihood in the subterranean reservoir.

15. A non-transitory computer-readable medium comprising instructions that are executable by a processing device for causing the processing device to perform operations comprising:

receiving pre-stack seismic data that includes a plurality of data elements that are seismically acquired for a plurality of geometric locations with respect to a subterranean reservoir;

determining, using the pre-stack seismic data, a plurality of input features for each geometric location of the plurality of geometric locations, the plurality of input features representing at least one characteristic of the pre-stack seismic data;

training a machine-learning model by using post-drill data about content and type of fluid in a historical subterranean reservoir and a computed plurality of historic input features that include (i) lithology and rock total compressibility of the historical subterranean reservoir, and (ii) entropy that is a measure of heat transfer of the historical subterranean reservoir;

executing the trained machine-learning model on values of the plurality of input features to determine a likelihood of a type of fluid in the subterranean reservoir and to determine a list of features affecting the likelihood; and outputting the likelihood and the list of features.

16. The non-transitory computer-readable medium of claim 15, wherein executing the trained machine-learning model on values of the plurality of input features to determine the likelihood of the type of fluid in the subterranean reservoir and to determine the list of features affecting the likelihood includes:

treating the values as actual values for the plurality of input features and determining the likelihood using the actual values;

generating varied values for the plurality of input features by varying one or more values for the plurality of input features;

determining, using the varied values for the plurality of input features, at least one varied likelihood of the type of fluid in the subterranean reservoir; and comparing the at least one varied likelihood to the likelihood to determine the list of features affecting the likelihood.

17. The non-transitory computer-readable medium of claim 16, wherein the list of features includes features listed in the order of relative influence in determining the likelihood of the type of fluid in the subterranean reservoir.

18. The non-transitory computer-readable medium of claim 15, wherein the plurality of input features includes an amplitude for each reflection angle of a plurality of reflection angles or for each offset of a plurality of offsets, amplitude frequency, structural features including lithology and rock total compressibility of the subterranean reservoir, and entropy that is a measure of heat transfer of the subterranean reservoir, and wherein the input features are generated from the pre-stack seismic data via data processing techniques in which each geographic location, and each angle or each offset are treated as time for the data processing techniques.

19. The non-transitory computer-readable medium of claim 15, wherein the operation of determining the plurality of input features includes determining a plurality of input features for each data element of the plurality of data elements.

20. The non-transitory computer-readable medium of claim 15, wherein the trained machine-learning model is a predictive model trained via a training process that includes:

receiving pre-stack seismic data about a historical subterranean reservoir, the pre-stack seismic data including a plurality of historic geometric locations;

establishing a variable window having a known seismic polarity for each historic geometric location within the plurality of historic geometric locations included in the pre-stack seismic data;

determining an optimum amplitude value for each geometric location within the variable window having the known seismic polarity, the optimum amplitude value being a minimum amplitude or a maximum amplitude;

determining, from post-drill data about the historical subterranean reservoir, content and type of fluid in the historical subterranean reservoir;

associating seismic depth and fluid depth using the post-drill data; and training the predictive model by using post-drill data about content and type of fluid in the historical subterranean reservoir and the computed plurality of historic input features.

\* \* \* \* \*